United States Patent [19]

Klein et al.

[11] Patent Number: 4,584,212

[45] Date of Patent: Apr. 22, 1986

[54] DECORATIVE GLASS SCULPTURE AND METHOD OF MANUFACTURE

[76] Inventors: Toan Klein, 9 Humewood Dr., Suite 9, Toronto, Ontario, Canada, M6C 1C9; Gary Klein, 413 Arlington Ave., Apt. 3, Toronto, Ontario, Canada, M6C 3A1

[21] Appl. No.: 599,271

[22] Filed: Apr. 11, 1984

Related U.S. Application Data

[63] Continuation-in-part of Ser. No. 116,665, Jan. 29, 1980.

[51] Int. Cl.⁴ .............................................. B44F 1/10
[52] U.S. Cl. .................................... 428/13; D11/158; 428/67; 428/542.2
[58] Field of Search .................. 428/542.2, 13, 51, 67, 428/913, 919; 430/17, 13; 434/81, 82; D11/131, 158; D19/96, 97; 40/160; 156/58, 59, 298, 303.1

[56] References Cited

U.S. PATENT DOCUMENTS

| | | | |
|---|---|---|---|
| 58,410 | 10/1866 | Hartell | 428/13 X |
| D. 259,866 | 7/1981 | Mortillaro | D11/131 |
| 1,506,677 | 8/1924 | Shipton et al. | 428/13 |
| 2,065,406 | 12/1936 | Silverman | 428/13 |
| 2,124,143 | 7/1938 | Long | 52/104 |
| 2,182,334 | 12/1939 | Crespo | 428/13 X |
| 2,511,552 | 6/1950 | Stuempges | 428/13 |
| 2,577,320 | 12/1951 | Fenyo | 428/13 X |
| 2,636,301 | 4/1953 | Wilmsen | 428/13 |
| 2,646,380 | 7/1953 | Barlow et al. | 156/224 X |
| 2,704,211 | 3/1955 | De Cepoli | 428/66 X |
| 2,716,300 | 8/1955 | Bopp | 428/13 |
| 2,731,672 | 1/1956 | Davis et al. | 428/13 X |
| 2,917,856 | 12/1959 | Soloff | 428/13 |
| 2,980,533 | 4/1961 | Charlton | 428/13 X |
| 3,463,624 | 8/1969 | Labino | 428/13 X |
| 4,043,084 | 8/1977 | Kuris | 428/13 X |
| 4,180,930 | 1/1980 | Di Matteo | 40/160 |
| 4,243,626 | 1/1981 | Prete | 428/13 X |
| 4,277,139 | 7/1981 | Cox | 428/13 X |
| 4,330,578 | 5/1982 | Nishihara et al. | 428/13 |
| 4,347,270 | 8/1982 | Hart | 428/13 |

FOREIGN PATENT DOCUMENTS 5146 of 1879 United Kingdom ................ 428/35

Primary Examiner—Henry F. Epstein
Attorney, Agent, or Firm—Kenneth M. Garrett

[57] ABSTRACT

The sculpture is created by accreting successive layers of a vitreous material under close temperature control on a core to form a solid unified mass and of depositing pellicular images on one or more of said layers; said images, which may be photographically generated, being variously sinuous, discrete, diaphanous, colored and spaced apart from each other in both radial and axial directions of the solid mass which constitutes the sculpture and which is characterized by said images apparently floating freely within the mass composing a general design, scene, display or decoration.

12 Claims, 18 Drawing Figures

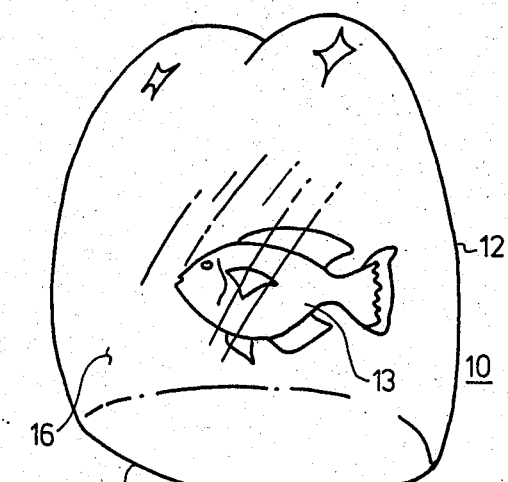
FIG.1.
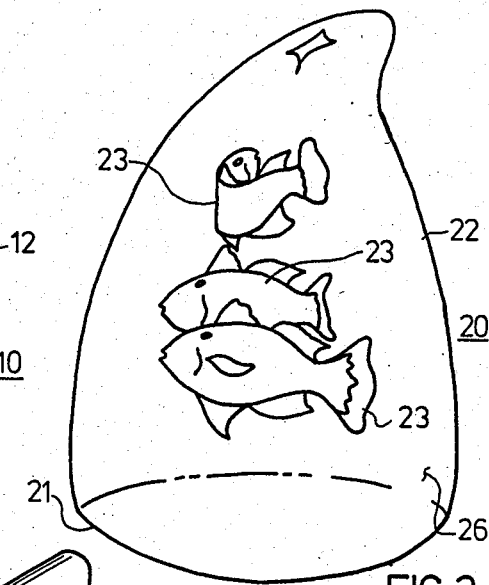
FIG.2.
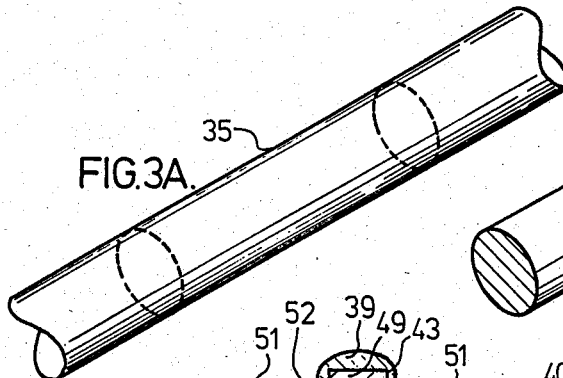
FIG.3A.
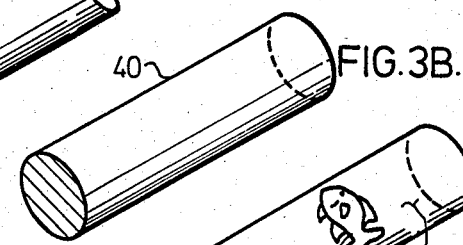
FIG.3B.
FIG.3E.
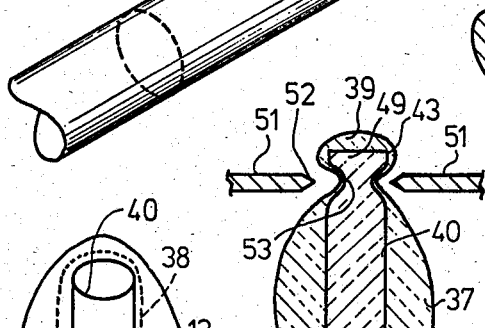
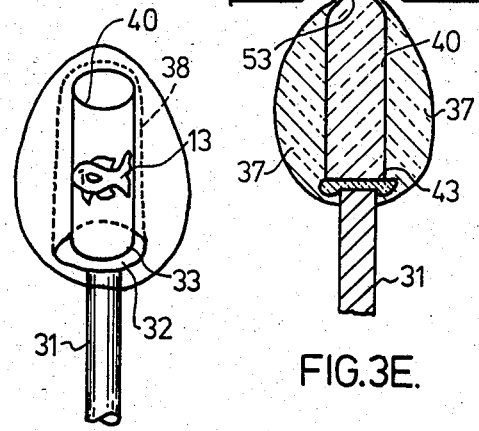
FIG.3D.
FIG.3E.
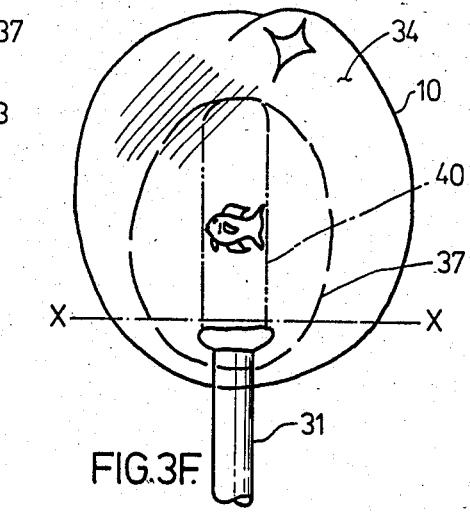
FIG.3F.

DECORATIVE GLASS SCULPTURE AND METHOD OF MANUFACTURE

RELATED APPLICATION

This application is a continuation-in-part of U.S. patent application Ser. No. 116,665 filed Jan. 29, 1980.

FIELD OF THE INVENTION

This invention is in the field of solid transparent vitreous masses with one or more pictorial elements deeply imbedded therein creating the illusion that such elements are "floating" within the mass.

BACKGROUND OF THE INVENTION

Various methods have been employed in the past to produce decorative visual images in the interior of glass articles, and these methods have been described in the following U.S. Pat. Nos.; 2,646,380; 2,917,856; 2,065,406; 1,506,677; 58,410 and 2,511,552, as well as in British Pat. No. 5146 (Richardson—1879).

Ornamental inscription and designs of a degree of rough line texture has been earlier painted on cores which formed the interior of glass articles and an example of such an earlier sculpture is "Vase with Fish" by Orrefors, Sweden, circa 1947.

It is further known from Charlton, U.S. Pat. No. 2,980,533 to decorate bodies using translucent decals, which are embedded in a surface glaze. Where the body so decorated is transparent, it will be possible to view the surface decoration from the reverse side of the body over a reasonably wide angle of view, provided that the body is not shaped whereby it will function as a lens. Where the body is shaped whereby it will function as a lens, which is to say where it has an arcuately formed surface, the angle of view of the surface image, when viewed from the reverse face thereof, will be restricted, whereby only a small portion of the image, which is that portion locating close to a view line which is substantially normal to both reverse and obverse surfaces of the body, will be seen. On each angular side of such view line, the image will be perceived as being highly distorted, and as the angle of sight increases still further, internal reflection will occur whereby the image will not be seen.

Our invention provides for an improved method of producing a fine textured, mechanically reproducible photographic image in the interior of a transparent or translucent body of glass and results in the production of the sculptured glass article of the invention with an interior design of a higher degree of virtuosity, resolution and rendition than has been possible using the methods or processes of the prior art.

SUMMARY OF THE INVENTION

Our invention is a decorative glass sculpture and method of making same. The sculpture may be in the shape of a free form solid body of transparent or translucent glass, in the interior of which is a sharp pictorial design or scene composed of one or more images which may be photographically generated. The composition may display one or more images of continual colour tonal gradation or a continual gradation in a gray scale with a high degree of reproducible photographic accuracy.

According to a preferred embodiment the sculpture is initiated by a solid glass base core of a shape such as a cylinder, for example. The surface of the base core may be fire polished if necessary to eliminate any chill marks caused by marvering the core into the desired shape, so as to smooth its external surface. When cool, there is then deposited on an area of the external core surface an image which may be obtained by means of a photoceramic silk screen using conventional ceramic inks, or alternatively a ceramic-type decal transfer photographic print may be applied to the base external surface. Said image may be opaque or diaphanous or it may be opaque in one part and diaphanous in another. The thus decorated core is then heated to bake in the printed image and then a plurality of layers of molten glass are externally applied about the core to form the desired shape of the sculpture; the final outer shape of the sculpture being independent of the initial shape of the base core. Obviously, additional images may be deposited on one or more of the succeeding layers of glass to create an overall composition.

Where the glass of the core and of the outer layers chosen to be of the same colour, the photographic image is apparently seen to float or swim in the interior of the sculpture.

In accordance with one aspect of our invention, a sculpture comprises a mass of vitreous and mainly transparent material bounded by a surface envelope, and a diaphanous film like image, otherwise referred to as a pellicle image, which is embedded within the mass remote from the surface envelope, such that portions of the image, when viewed along a line of view are separated therealong. As the line of view is changed, the relationship of the image portions changes in a relatively predictable manner to thereby create a three dimensional effect from the essentially two dimensional pellicle image.

Generally speaking, the diaphanous pellicle image is embedded in the mass such that portions thereof are sinuously related. The three dimensional effect may be enhanced where at least parts of the image portions are separated along a line of sight by a core of vitreous material which restricts the view along the line of sight.

While there may be only one image, the sculpture may comprise a plurality of images that are spaced apart both radially and axially of each other. The plurality of images may be more or less continuous, or they may be physically spaced apart within the body.

In accordance with a further aspect of our invention, the mass may have horizontal cross sections of arcuate acircular form, the relationship of the image portions changing primarily in a predictable manner with a changing line of view, and in addition thereto, unpredictable relationships may also be perceived wherein parts of the image disappear and reappear somewhat unexpectedly due to internal reflection and refraction.

It is to be understood that the entire process described is subject to relatively strict temperature control of the glass.

BRIEF DESCRIPTION OF THE DRAWINGS

The objects and features of the invention may be understood with reference to the following detailed description of an illustrative embodiment of the invention, taken together with the accompanying drawings in which:

FIG. 1—is a perspective view of a sculpture of the invention;

FIG. 2—is a perspective view of an alternative embodiment of the invention;

FIGS. 3A-3B-3B'-3D and 3F—are perspective views of the intermediate stages of the invention during processing;

FIG. 3E—is a sectional view of an intermediate stage of the invention;

DESCRIPTION OF THE PREFERRED EMBODIMENT

Figure 4:
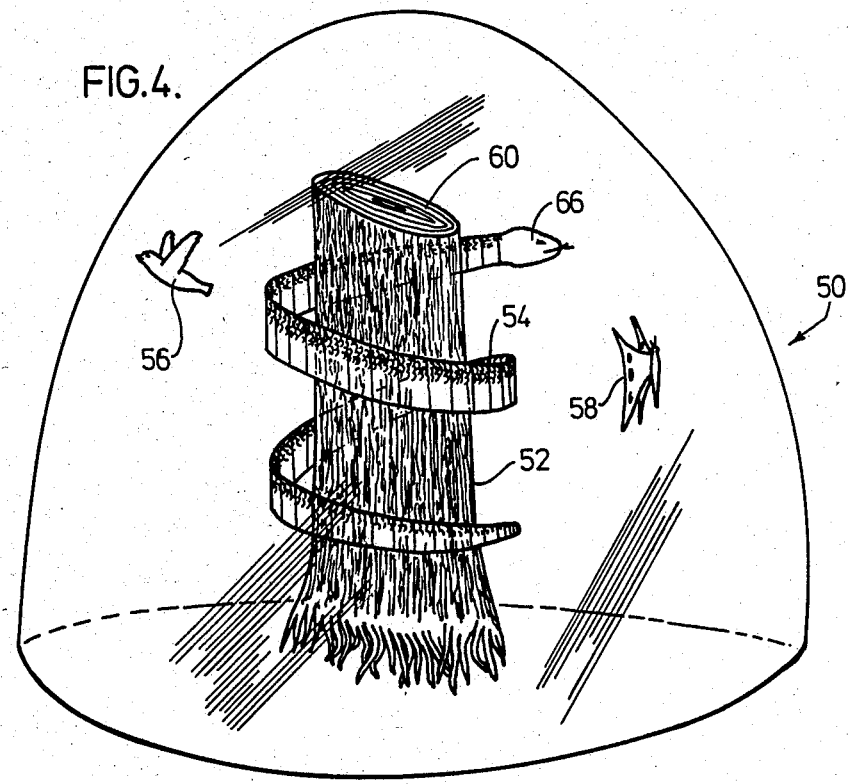
FIG. 4—is an elevational view of a sculpture according to the invention with imagery imbedded deeply therein including representations of a tree stump with an angularly truncated top exposing annular rings, a snake coiled about the tree stump, a bird and a butterfly.

Turning now descriptively to the drawing, in which similar reference characters denote similar elements throughout the several views, FIGS. 1 and 2 illustrate embodiments of the invention in the form of a free standing transparent glass sculptured bodies 10 and 20; each formed with a flat base surface 11 and 21 respectively, so as to be able to rest on a table top or other flat surface.

The exterior surface 12 and 22 respectively of each sculptured body is smooth and of any desired shape so as to produce an artistic effect.

In the interior of body 10, and located at a distance from the central axis of the body is image 13 which is apparently "floating" in the uniform transparent interior 16 of body 10. In the interior of body 20, and located at different distances from the central axis of body 20 are three such images 23 of the same character as image 13 and which may be spaced axially as well as radially from each other in the uniform transparent interior 26 of body 20 and, if desired, within the same sector of body 20.

To produce a sculpture as herein visualized image 13 is deposited on the smooth surface of a core body 40 shown in FIG. 3B'. For example, one convenient procedure for such deposit is by conventional silk screen photo printing techniques employing conventional ceramic inks. We have found that these ceramic inks will glaze to the surface of the glass core under heat and without injurious effect to the glass core since the silk screen techniques apply a uniform thin film of such inks to the surface 41 of the core 40. Alternatively image 13 may be obtained from a conventional ceramic-type photo decal, or ceramic transfer print and applied to core 40 in which case the print can be wrapped around core 40 giving it a sinuous appearance as in FIGS. 4 and 8.

In order to obtain a sufficiently smooth surface 41 to result in the accurate rendition of the fine texture of a photographic image, core body 40 may be pre-treated as described herein.

Core 40 is preferably formed as a cylindroid shape by gathering molten glass on the end of a pontil rod and marvering the glass to shape by rolling on a flat table, while the glass is at the working temperature.

When the marvered glass core cools slightly below its slump temperature cross chill marks and other irregularities on the surface of the core may then be removed, if necessary, by fire polishing the glass core body. The fire polishing step involves putting the piece, still attached to the pontil rod, back into a furnace and remelting the surface while heating the core body 35 to a temperature below that at which the interior of the core begins to deform. The glass and pontil rod may be rotated at this stage. The glass is now removed from the furnace and allowed to cool in an annealing furnace with the core shape suspended with the longitudinal axis of the core body 35 mounted in a vertical position to avoid any marks on the surface of the core shape. In appropriate circumstances one or more additional cores 40 may be cut from the cooled core body 35, (FIGS. 3A, 3B) and image 13 then applied, as shown in FIG. 3B'.

After image 13 has been deposited on the surface 41 of the core, the inks are allowed to dry thoroughly so that all water and other solvents, if any, are completely vaporized out of the inks.

More than one image may of course be applied to the core. When using decals which overlap on the same surface, it is desirable to heat the core to the maturation point of the first applied decal, cool it, and then apply the second decal. This prevents clumping and coagulation of the pigments from the two transfers which would otherwise occur. By precisely overlapping two of the same images, the resulting image may be darkened or intensified.

The thus decorated core is now carefully heated in a warm-up oven to the approximate annealing temperature of the glass, after which the core is coated with a first layer of hot glass which may be done in the following manner:

A hot pontil rod 31 is coated on the tip 32 with liquid glass. This glass tip 32 is used to attach the pontil to the base 33 of the decorated core 40 and then to remove core 40 from the warm-up oven. Care must be taken to equalize the temperature of the glass 32 on the end of the pontil, and the glass core 40. Colours of the image 13 remain brightest when the decorated core is minimally reheated. The less uncoated decorated core is exposed to temperatures over the maturation point of the pigments, the more intense the rendering, while exposing the ceramic pigments to excess heat may shift or "burn out" the colours. On the other hand, this fact may be used to advantage by selectively heating parts of a core before further gathering, to fade out colours in a particular area of layer.

In all cases it is preferable that the core and the gathered glass be of similar characteristics. However slight differences of glass constituents may be tolerated—even be advantageous—and the core may be more or less translucent than the outer layers of gathered glass.

Glass is now gathered in a plurality of successive layers over the core to form the intermediate mass 37 of the body 10. Caution is exercised to insure that the glass at the end of the pontil is not too hot when making the first gather, otherwise control will be hard to maintain if slump temperature of this glass is reached. During this and all subsequent gather operations on the piece, the decorated core is kept at as low a temperature as possible consistent with avoiding stress and fracture of the piece. This insures the sharpest possible delineation of the decoration. Best results are obtained when the first gather 38 directly over the decoration, is a layer that is as thin as possible. This minimizes distortion such as might otherwise result from excess heating and melting of the core 40. As is usual in gathering consecutive layers of glass, the preceding layer should be allowed to harden before another gather is made. Subsequent layers then provide thermal insulation to the first thin layer, permitting larger and thicker subsequent gathers to be taken to form the outer mass 34 of body 10.

Imagery may be built up in spaced layers to form a body 22. This is done by treating the piece of glass after the first decoration has been encased by glass, in exactly the same manner as the original core was formed. It is then cooled, decorated again, heated, and gather over. This process may be repeated as many times as desired. This results in imagery on various planes and levels and gives depth perspective into the piece.

An especially effective floating or swimming image is obtained by using a transparent glass of the same colour throughout the build up of the core and subsequent layers. Crystal clear gives this effect best, although any tint works well.

Sculptures may take on any shape desired, without distorting the internal decoration. This is done by firstly keeping the decorated core as hard as possible during the build up of layers and subsequent shaping. Secondly, the more glass gathered between the last layer of interior decoration and the exterior of the piece, the more room is left for manipulation without distortion. Controlled optical distortion may be effected by distributing the glass in a non-uniform manner. The effect may also be achieved through subsequent grinding and polishing operations.

Our decorating process in no way prohibits the conjunctive use of any and all normal glass making decorative procedures in or on the piece, including spirals, chemical decoration, feathering, canes, brushed on pigments, sandblasting, acid-etching and engraving.

In order to prevent the rough cut edges 43 and the roughened end sawed surfaces of the core from being visible in the final product, where core 40 is cut at each end by a conventional saw (not shown), the method showing in FIGS. 3D and 3E is followed.

At a selected stage in its formation, intermediate mass 37 may be held in the vertical position of FIG. 3E inducing sagging of the hot gather downwardly from tip 39 of mass 37 and core 40 almost baring core top 49. At that point and while the core top 49 is still quite plastic the top section of mass 37 including its tip 39 as well as the top 49 of the core is cut off by first jacking the top section and squeezing it in a jacking tool of spring metal, and then cutting this squeezed top section by a gob shears, the jaws 51 of which shear off the top section of 49 and 39. The remaining glass attached to the pontil rod 31 is then gathered as noted heretofore to add the outer mass 34. The shearing off of the top tip section, as noted, by gob shears while the glass is in the semi-liquid state results in a smooth surface between the top of the core and the outer glass of the final gather so as to form an invisible surface in the final sculpture. The pontil rod with the attached glass is separated from the sculpture 10 in the fashion well known in the art along the plane X—X exposing a flat base surface which may be polished or left in the roughened state, as desired. Preferably, plane X—X is selected so as to cut off a bottom section of the core and thereby eliminate the rough interface between the bottom initial surface of the core and the glass surrounding the core.

Since all remaining visible interface surfaces between the core and the intermediate and outer masses of gathered glass are fire polished, these interfaces are not visible.

A somewhat more sophisticated rendering of a sculpture according to the present invention is illustrated in FIGS. 4 to 8 inclusive.

The sculpture illustrated in FIG. 4 is a transparent vitreous mass 50 containing an interior display comprised of a tree stump 52; a snake 54 coiled about stump 52 with a bird 56 on one side and butterfly 58 on the other. These various representations are respectively derived from the diaphanous ceramic pellicles illustrated in FIGS. 5A to 5E inclusive being the representation of a tree trunk (FIG. 5A); a representation of the annular rings normally appearing at the truncated end of a tree trunk (5B); butterfly 58 (5C); bird 56 (5D) and an elongated representation of snake 54 (5E).

Figure 5A:
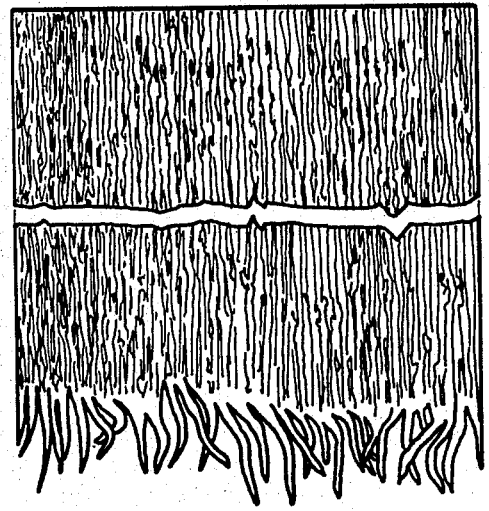
FIG. 5A—is a plan view of a pellicle having the design features of a tree stump.

To create the display of FIG. 4, the tree trunk representation of FIG. 5A is wrapped around a core which is not illustrated but which, being similar to core 40 shown in FIG. 3B, will be understood. The lower end of the decorated core 40 is then bulged—e.g. by pressing it against a paddle giving it the natural appearance shown after which several layers of glass are accreted thereon and cut along FIG. 6 plane VII—VII to produce the form shown in FIG. 6 being that of a tree stump with a truncated top 60 and with a lobe 62 at one side thereof adjacent its top 60.

Figure 5B:
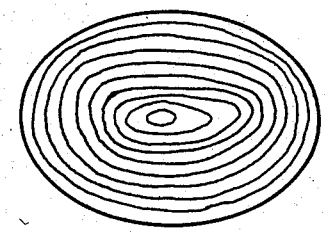
FIG. 5B—is a plan view of a pellicle having the design of annular rings of the tree stump of FIG. 4.
Figure 5C:
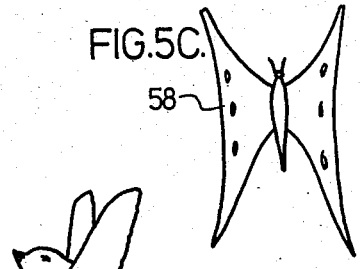
FIG. 5C—is an elevational view of a pellicle bearing the representation of a butterfly.
Figure 5D:
FIG. 5D—is an elevational view of a pellicle bearing the representation of a bird.
Figure 5E:
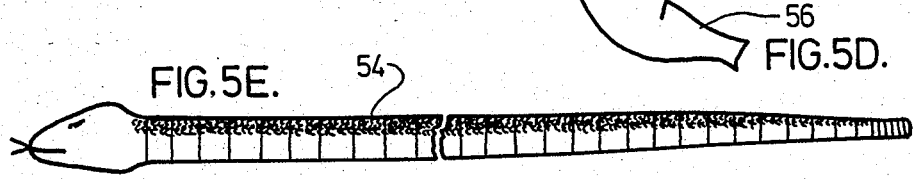
FIG. 5E—is an elevational view of a pellicle bearing the representation of a snake of FIG. 4, the snake being outstretched in this view.
Figure 6:
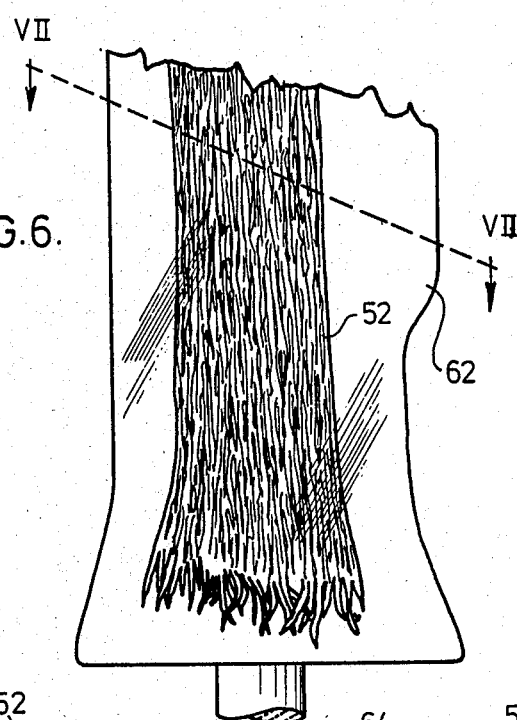
FIG. 6—is an elevational view of a workpiece at an intermediate point in the production of the sculpture of FIG. 4.
Figures 7A, 7B:
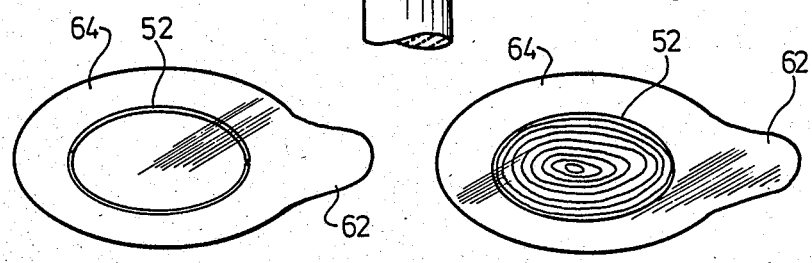
FIG. 7A—is a section along line VII—VII of FIG. 6.
FIG. 7B—is the view of FIG. 7A with the pellicle of FIG. 5B applied thereto.

Viewed in plan the tree stump of FIG. 6 then presents the appearance of FIG. 7A in which the top 60 of the tree stump is seen to be surrounded by a glass layer 64 in which is included lobe 62. The transfer shown in FIG. 5B is deposited over the truncated end of the tree stump 52 producing the result of FIG. 7B.

Figure 8:
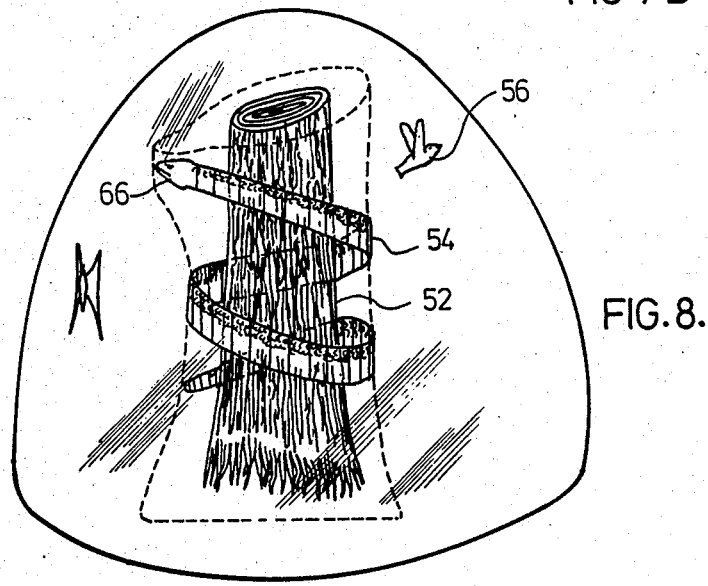
FIG. 8—is a view of the sculpture of FIG. 4 displaced approximately 180° with broken lines showing the approximate location of the workpiece of FIG. 6 imbedded therein after it is truncated along the plane VII—VII.

The snake 54 (FIG. 5E) is coiled around the glass layer 64 so that the snake's head 66 occurs on lobe 62 as in FIG. 8 after which successive layers of glass are further accreted on the product; the butterfly 58 (FIG. 5C) and bird 56 (5D) being deposited on different layers of the said product and at various levels thereon producing the sculpture of FIG. 4; it being observed once again that the glass accretion performed as hereinbefore described tends to erase and obliterate the interfaces of the several glass layers.

The broken lines in FIG. 8 are intended to delineate the normally invisible interface between the glass layer 64 and the vitreous mass 50; the latter being rotated somewhat relative to FIG. 4 to particularly point the placement and organization of its various parts in the design as a whole and also to illustrate graphically the fact that the design presents a three-dimensional character when viewed from different lines of vision.

Since obvious changes may be made in the specific embodiment of the invention described herein, such modifications being within the spirit and scope of the invention claimed, it is indicated that all matter contained herein is intended as illustrative and not as limiting the scope of the invention as defined in the following claims.

We claim:

1. Sculpture comprising a mass of vitreous and mainly transparent material bounded by an arcuately curved surface, and a two dimensional diaphanous pellicle image embedded within said mass remote from said surface, portions of said image when viewed along a line of view passing through said arcuately curved surface being separated therealong,
  whereby as the line of view is changed, the relationship of said image portions changes in a relatively predictable manner to thereby create a three dimensional image effect.

2. Sculpture as defined in claim 1, wherein said diaphanous pellicle is embedded in said mass such that portions thereof are sinuously related.

3. Sculpture as defined in claim 2, wherein at least parts of said sinuously related portions are separated along a line of sight by a core of vitreous material which restricts the view along said line of sight.

4. Sculpture as defined in claim 2, including a plurality of said images that are spaced apart both radially and axially of each other.

5. Sculpture as defined in claim 1, wherein said mass is solid.

6. Sculpture as defined in claim 1, wherein said image is a photographic image.

7. Sculpture comprising
  a mass of vitreous and mainly transparent material bounded at least in part by an arcuately formed surface;
  a sinuously formed two dimensional diaphanous pellicle image embedded within said mass remote from said surface;
  portions of said image thereby being spaced apart within said mass, said spaced apart portions being viewable along a line of sight passing through said arcuately formed surface; the relationship between said image portions changing in a generally predictable manner with a shifting line of view so as to give an illusion of a three dimensional image.

8. Sculpture as defined in claim 7, wherein said arcuately formed is acircular in horizontal cross sections along which it is generally intended that the image be viewed, the relationship of said image portions additionally showing relatively unpredictable changes with a shifting line of view.

9. Sculpture as defined in claim 7, including a plurality of images spaced apart both radially and axially.

10. Sculpture as defined in claim 9, wherein at least one of said images has parts that are separated at least partially by a core which restricts the view along a line of view.

11. Sculpture as defined in claim 7, wherein said mass is solid.

12. Sculpture as defined in claim 7, wherein said image is a photographic image.

* * * * *